United States Patent
Fukano et al.

(10) Patent No.: US 7,715,096 B2
(45) Date of Patent: May 11, 2010

(54) LIGHT DIFFUSING SCREEN

(75) Inventors: Yoshifumi Fukano, Tokyo-To (JP); Futoshi Osawa, Tokyo-To (JP)

(73) Assignee: Dai Nippon Printing Co., Ltd., Shinjuku-Ku (JP)

( * ) Notice: Subject to any disclaimer, the term of this patent is extended or adjusted under 35 U.S.C. 154(b) by 776 days.

(21) Appl. No.: 10/588,688

(22) PCT Filed: Feb. 10, 2005

(86) PCT No.: PCT/JP2005/002062

§ 371 (c)(1),
(2), (4) Date: Jan. 26, 2007

(87) PCT Pub. No.: WO2005/083510

PCT Pub. Date: Sep. 9, 2005

(65) Prior Publication Data

US 2007/0159691 A1    Jul. 12, 2007

(30) Foreign Application Priority Data

Feb. 26, 2004  (JP) .............................. 2004-051032

(51) Int. Cl.
*G03B 21/60*    (2006.01)
(52) U.S. Cl. ........................................ 359/453; 359/457
(58) Field of Classification Search ......... 359/452–453, 359/457, 460
See application file for complete search history.

(56) References Cited

U.S. PATENT DOCUMENTS

| | | | |
|---|---|---|---|
| 4,725,134 A * | 2/1988 | Ogino | 353/74 |
| 5,581,407 A * | 12/1996 | Mitani et al. | 359/619 |
| 6,271,965 B1 | 8/2001 | Miyata | |
| 6,295,162 B1 | 9/2001 | Miyata | |
| 2004/0257650 A1 * | 12/2004 | Parusel et al. | 359/453 |

FOREIGN PATENT DOCUMENTS

| | | |
|---|---|---|
| JP | 01-161328 A1 | 6/1986 |
| JP | 04-270334 A1 | 9/1992 |
| JP | 10-268428 A1 | 10/1998 |
| JP | 2003-131326 A1 | 5/2003 |
| JP | 2004-045588 A1 | 2/2004 |
| WO | WO 98/03898 A1 | 1/1998 |
| WO | WO 98/32049 A1 | 7/1998 |

* cited by examiner

*Primary Examiner*—Christopher Mahoney
(74) *Attorney, Agent, or Firm*—Burr & Brown

(57) ABSTRACT

A light diffusing screen for a single light source-type rear projection television, for use in combination with a Fresnel lens sheet, which can reduce scintillation and, regulate the surface roughness of the screen and provide good images. The light diffusing screen includes: a lens layer which can horizontally refract projected light; and a light diffusing layer provided on a light outgoing side as compared with the lens layer. The light diffusing layer includes a light transparent matrix and light diffusing fine particles formed of a light transparent material dispersed in the light transparent matrix. The light diffusing layer has a multilayer structure of which the outermost layer on the light outgoing side of the light diffusing layer is a layer which diffuses light most strongly, the outermost surface layer on the light outgoing side in the light diffusing screen having a surface roughness Ra of 0.2 $\mu m \leq Ra \leq 1.0 \mu m$.

7 Claims, 3 Drawing Sheets

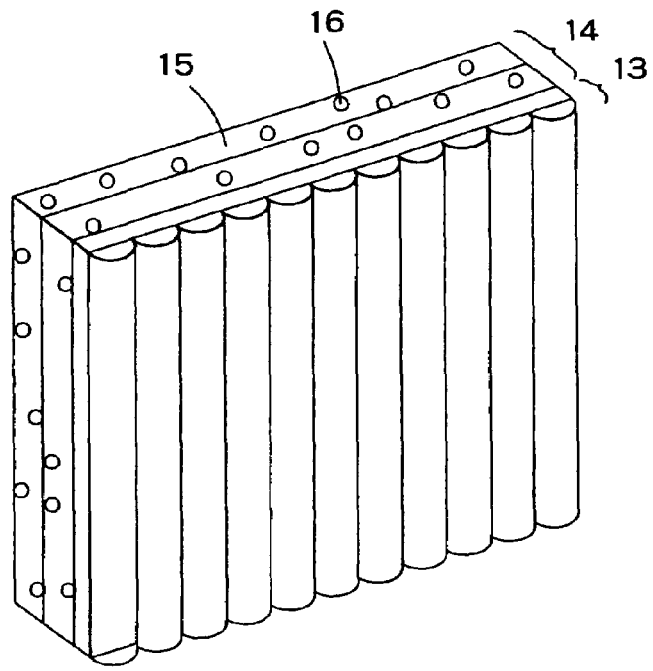
F I G. 4
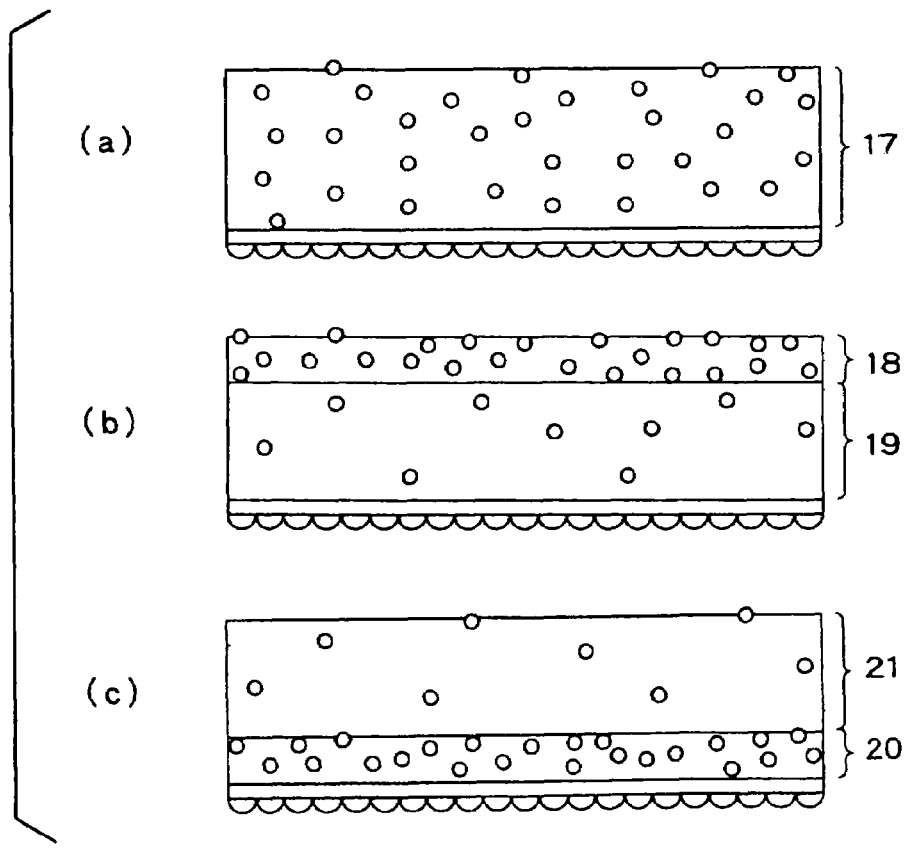
F I G. 5

LIGHT DIFFUSING SCREEN

TECHNICAL FIELD

The present invention relates to a light diffusing screen for use, for example, in transmission projection televisions for single light sources.

BACKGROUND ART

CRT light sources have hitherto been mainly used as light sources for rear projection-type projection televisions. In recent years, however, single tube-type light sources such as LCDs or DMDs are becoming mainly used.

In order to reduce external light reflection from the surface of televisions, the formation of a low-reflection layer on the screen surface or the formation of fine concaves and convexes on the screen surface (hereinafter referred to as "mattering") are favorably carried out.

Further, in the conventional transmission screen, since resin materials are generally used, disadvantageously, the screen surface is likely to be scratched and undergo deposition of dust. To overcome this problem, it is common practice to adopt the formation of a hardcoat layer on the screen surface or the antistatic treatment of the screen surface.

DISCLOSURE OF THE INVENTION

As compared with projection televisions using CRT light sources, in single light source-type projection televisions, for light source construction reasons, slight unevenness of brightness of outgoing light (hereinafter referred to as "scintillation") is more likely to occur.

Further, regarding matting of the screen surface, when the roughness of the screen surface is small, the effect of reducing external light reflection is small. On the other hand, when the surface roughness of the screen is excessively high, the picture plane becomes seen whitish and the contrast is lowered. Therefore, in this case, the surface roughness of the screen should be regulated to a suitable level.

Accordingly, the present invention has been made with a view to solving the above problems of the prior art, and an object of the present invention is to provide a light diffusing sheet that can reduce scintillation of a single light source-type projection television, can further regulate the roughness of the screen surface, and can provide good picture images.

The above object can be attained by the following means.

Specifically, the invention as defined in claim 1 is directed to a light diffusing screen for a single light source-type rear projection television for use in combination with a Fresnel lens sheet, characterized in that said light diffusing screen comprises: a lens layer which can horizontally refract projected light; and a light diffusing layer provided on light outgoing side as compared with said lens layer, said light diffusing layer comprising a light transparent matrix and light diffusing fine particles formed of a light transparent material dispersed in the light transparent matrix, the light diffusing layer has a multilayer structure in which the outermost layer on the light outgoing side of the light diffusing layer is a layer which diffuses light most strongly, and the outermost surface layer on the light outgoing side in the light diffusing screen has a surface roughness Ra of 0.2 $\mu m \leq Ra \leq 1.0\ \mu m$.

The invention as defined in claim 2 is directed to a light diffusing screen according to claim 1, wherein at least one layer constituting said light diffusing layer comprises said light transparent matrix and said light diffusing fine particles satisfying formula [I]

$$0 < |Np - Ns| \leq 0.05 \quad [1]$$

wherein Np represents the refractive index of said light transparent matrix; and Ns represents the refractive index of said light transparent material constituting said light diffusing fine particles.

The invention as defined in claim 3 is directed to a light diffusing screen according to claim 1 or 2, wherein said outermost layer on the light outgoing side in said light diffusing layer is the outermost surface layer on the light outgoing side of said light diffusing screen.

The invention as defined in claim 4 is directed to a light diffusing screen according to any one of claims 1 to 3, wherein said outermost layer on the light outgoing side of said light diffusing layer comprises protrusions of said light transparent diffusing fine particles in their at least a part projected from within said light transparent matrix.

The invention as defined in claim 5 is directed to a light diffusing screen according to any one of claims 1, 2, and 4, wherein a hardcoat layer is further provided on the surface of the outermost layer on the light outgoing side of said light diffusing layer and said hardcoat layer is the outermost surface layer on the light outgoing side of said light diffusing screen.

The invention as defined in claim 6 is directed to a light diffusing screen according to claim 5, wherein said hardcoat layer contains therein an antistatic agent.

The invention as defined in claim 7 is directed to a process for producing a light diffusing screen, characterized in that, in a heat shrink process involved in cool solidification and/or curing in forming the light diffusing layer in a light diffusing screen according to any one of claims 1 to 6 from a mixture of light transparent diffusing fine particles and a light transparent matrix different from each other in heat shrinkage, at least a part of said light transparent diffusing fine particles is projected from within said light transparent matrix.

The present invention can provide a light diffusing screen that can reduce scintillation of a single light source-type projection television and, at the same time, can further regulate the roughness of the screen surface, and can provide good picture images.

BRIEF DESCRIPTION OF THE DRAWINGS

[FIG. 4] A perspective view showing a light diffusing screen according to the present invention obtained in Example 1.

[FIG. 5] A cross-sectional view showing light diffusing screens used in the evaluation in Examples and Comparative Examples.

BEST MODE FOR CARRYING OUT THE INVENTION

Embodiments of the light diffusing screen according to the present invention will be described in detail with reference to the accompanying drawings.

Figure 1:
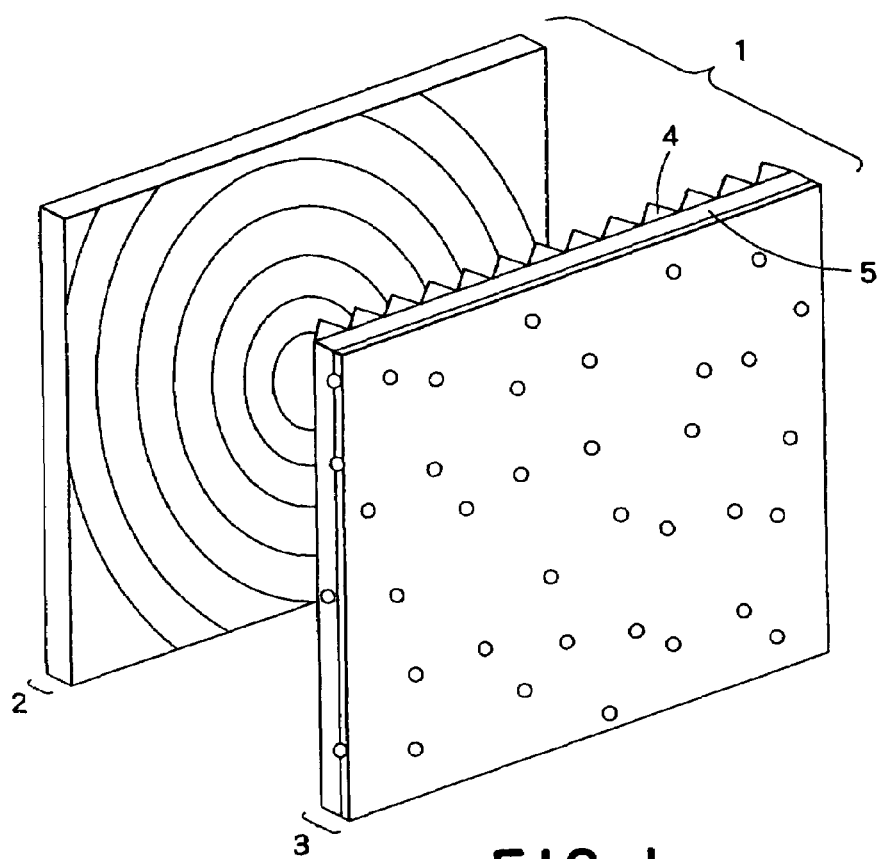
[FIG. 1] A perspective view showing a preferred embodiment of the light diffusing screen according to the present invention.

FIG. 1 is a diagram showing one preferred embodiment of the transmission screen according to the present invention. A transmission screen 1 in this embodiment comprises a Fresnel lens sheet 2 and a light diffusing screen 3 disposed on the viewer side (that is, light outgoing side) as compared with the Fresnel lens sheet 2.

The light diffusing screen 3 comprises a lens layer 4, which functions to refract and/or totally reflect projected light horizontally toward the light incident side, and a light diffusing layer 5 provided on the viewer side (that is, light outgoing side) and comprising a light transparent matrix and light diffusing fine particles formed of a light transparent material.

The lens layer 4 is not limited to the lens layer shown in FIG. 1 and may be in any form so far as it functions to horizontally refract light, for example, a lenticular lens form. The lens layer 4 may be formed, for example, using a resin for optical applications, such as polymethyl methacrylates (PMMAs), polycarbonates (PCs), or methyl methacrylate-styrene copolymer resins (MSs), for example, by extrusion, injection molding, or pressing. Alternatively, the lens layer 4 may be formed by feeding an ionizing radiation curable resin into between an emboss roll and a transparent base material, and applying an ionizing radiation from the transparent base material side to cure the resin and, at the same time, to polymerization bond lenses as the resin molded product to the transparent base material. In this case, the formation of the lens layer 4 is not particularly limited to the material.

Figure 2:
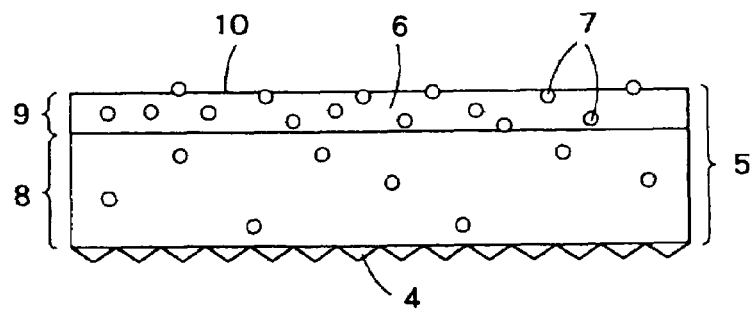
[FIG. 2] A cross-sectional view showing the construction of a light diffusing screen according to the present invention.

FIG. 2 is a diagram showing one embodiment of the construction of a light diffusing screen 3.

A light diffusing layer 5 comprises a light transparent matrix 6 and a light diffusing material 7 formed of a light transparent material. Materials for the light transparent matrix 6 include, for example, resins for optical applications, such as polymethyl methacrylates (PMMAs), methyl methacrylate-styrene copolymer resins (MSs) or polycarbonates (PCs). The light diffusing layer 5 may be formed using these materials, for example, by extrusion, injection molding, or pressing. Examples of the light diffusing material 7 include, for example, polyester resins such as polyethylene terephthalate (PET) and polybutylene terephthalate, acrylic resins such as polymethyl methacrylate, polycarbonate resins, crosslinked resin beads such as polystyrene resin, and glass and silicone beads. These materials may be produced, for example, by emulsion polymerization or bead grinding. The particle diameter and mixing amount thereof of the light diffusing fine particles 7 may be properly selected according to the types and a combination of the light transparent matrix and the light diffusing material, the effect to be attained, specific applications of the light diffusing screen according to the present invention, purposes and the like.

In the embodiment shown in FIG. 2, the light diffusing layer 5 has a two-layer construction comprising a light incidence side light diffusing layer 8 and a surface layer side light diffusing layer 9. In this case, the amount of the light diffusing material added in the surface layer side light diffusing layer 9 is larger than the amount of the light diffusing material added in the light incidence side light diffusing layer 8, and the outermost layer on the light outgoing side of the light diffusing layer 5 (that is, the light diffusing layer 9 on the surface layer side) is a layer which diffuses light most strongly in the light diffusing layer 5. The surface layer side light diffusing layer 9 can be brought to a layer which diffuses light most strongly by, while taking into consideration light diffusion properties of other layer(s) in the light diffusing layer 5, properly selecting the type of the diffusing material to be incorporated in the surface layer side light diffusing layer 9, the amount of the diffusing material added, the type of the light transparent matrix, and a combination of them. In the same manner as described above, the amount of the light diffusing fine particles 7 incorporated in the surface layer side light diffusing layer 9 can also be properly selected according to the effect to be attained, specific applications of the light diffusing screen, purposes and the like.

In this way, when the light diffusing effect is focused on a position around the surface layer, the diffusion in the Fresnel lens sheet and the diffusion in the light diffusing screen are located in the two layers. Accordingly, the pupil diameter can be increased in a quasi manner, and, consequently, the scintillation can be reduced.

The light outgoing face 10 of the surface layer side light diffusing layer 9 has concaves and convexes formed by projection of a part of the light transparent light diffusing fine particles 7 from the light transparent matrix 6. In FIG. 1, the surface layer side light diffusing layer 9 is the outermost surface layer on the light outgoing side of the light diffusing screen 3.

The concaves and convexes are formed by a difference in shrinkage between the light transparent matrix 6 and the light diffusing fine particles 7 in cooling solidification or curing in the step of forming the light diffusing layer 9. Regarding the light outgoing face 10, the surface roughness was regulated by varying the amount of the diffusing material added and production conditions to prepare several screen samples different from each other in surface roughness Ra (center line average roughness with respect to amplitude of fine concaves and convexes as measured with a contact-type measuring device) which were then evaluated. As a result, it was found that good picture images can be obtained by regulating the surface roughness Ra to $0.2 \; \mu m \leq Ra \leq 1.0 \; \mu m$. When Ra is less than $0.2 \; \mu m$, the effect of reducing external light reflection is not satisfactory. On the other hand, when Ra exceeds $1.0 \; \mu m$, the surface roughness is so high that the picture plane becomes seen whitish and the contrast is lowered. In the present invention, Ra was determined based on a method specified in ISO 468-1982, ISO 4287/1-1984.

In the embodiment shown in FIG. 2, the light diffusing layer 5 has a double layer structure comprising a light incidence side light diffusing layer 8 and a surface layer side light diffusing layer 9. The amount of the diffusing material added, the type of the diffusing material and the number of diffusing layers are not particularly limited so far as the surface layer side light diffusing layer can diffuse most strongly.

Materials for the light transparent matrix 6 and the light diffusing material 7 may be properly selected from various materials and used in combination so that the refractive index difference is $0 < |Np-Ns| \leq 0.05$. When the refractive index difference $|Np-Ns|$ exceeds 0.05, the amount of the light diffusing material 7 should be reduced to maintain a high level of brightness. In this case, the number of times of diffusion of incident light by the light diffusing material 7 is reduced. As a result, the quantity of light which exits through the light transparent matrix 6 without diffusion is increased. This is causative of worsening of scintillation.

Next, a construction in which a hardcoat layer is further provided on the surface of the outermost layer of the light diffusing layer will be described in detail in conjunction with FIG. 3.

Figure 3:
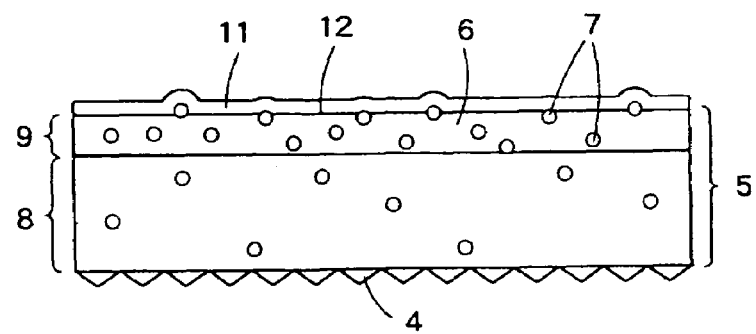
[FIG. 3] A cross-sectional view showing a light diffusing screen comprising a hardcoat layer provided on the light diffusing screen shown in FIG. 2.

FIG. 3 is a diagram showing a construction in which a hardcoat layer 11 is further provided on the light diffusing sheet 3 shown in FIG. 2 in its viewer side (that is, light outgoing side).

The hardcoat layer may be formed, for example, by coating a liquid ionizing radiation curable hardcoating agent onto the surface of the light diffusing sheet 3, for example, by dip coating or roll coating and applying an ionizing radiation to the coating. In FIG. 3, this hardcoat layer 11 is the outermost surface layer on the light outgoing side of the light diffusing screen 3.

As described above, in order to provide good images as a screen, regulation should be made so that, also after the hardcoat layer formation, the surface roughness Ra of the light outgoing face 12 is 0.2 μm≦Ra≦1.0 μm. To this end, the surface roughness of the light diffusing sheet before hardcoat formation and the thickness of the hardcoat layer should be regulated. The surface roughness Ra of the light diffusing sheet before hardcoat formation is preferably 0.5 μm≦Ra, and the thickness th of the hardcoat layer is 2 μm≦th≦10 μm. When th<2 μm, satisfactory hardcoat properties cannot be obtained. On the other hand, when 10 μm<th, the surface roughness after hardcoating is so small that the effect of reducing external light reflection is not satisfactory.

EXAMPLES

Example 1

A light diffusing screen for a single light source-type rear projection television for use in combination with a Fresnel lens sheet was prepared using a lenticular lens layer 13 and a light diffusing layer 14 as shown in FIG. 4. The lenticular lens layer 13 was prepared by forming a lenticular lens formed of a cured product of an ultraviolet curable resin having a lens pitch P=150 μm, a lens transverse diameter a=0.08 mm, and a lens longitudinal diameter b=0.07 mm on 125 μm-thick PET.

PMMA was used as a light transparent matrix 15 of the light diffusing layer 14, and PMMA and a material prepared by regulating polymerization ratio between PMMA and PS were used as a light diffusing material 16.

At the outset, the refractive index Np of the light transparent matrix 15 was fixed to 1.49, and the refractive index of the light diffusing material 16 was regulated to 1.52. Using these materials, samples having three light diffusing layer constructions as shown in FIG. 5 were prepared. For the three types of samples, the peak gain (as measured with a small angle luminance meter) was regulated to 4, the thickness of the light diffusing layer was t=2 mm. FIG. 5A (Comparative Example 1) shows a light diffusing layer 17 having a single-layer construction, and FIGS. 5B and 5C each show a light diffusing layer which has been divided into a light incident side light diffusing layer and a surface layer side light diffusing layer. The construction of the light diffusing layer shown in FIG. 5B (Example 1) was such that a diffusing material was added so that the concentration of the diffusing material in the surface layer side light diffusing layer 18 was three times the concentration of the diffusing material in the light incident side light diffusing layer 19, the thickness of the surface layer side diffusing layer was t18=0.5 mm, and the thickness of the light incident side diffusing layer was t19=1.5 mm. The construction of the light diffusing layer shown in FIG. 5C (Comparative Example 2) was such that a diffusing material was added so that the concentration of the diffusing material in the light incident side light diffusing layer 20 was three times the concentration of the diffusing material in the surface layer side light diffusing layer 21, the thickness of the light incident side light diffusing layer was t20=0.5 mm, and the thickness of the surface layer side diffusing layer was t21=1.5 mm. The gain is a value obtained by allowing light to enter the screen from the rear of screen (projector side), measuring the angle distribution of brightness of light which emerges forward, and determining the gain by a relational expression of illuminance (lux) in the screen. The peak gain is the maximum value in the gain values at various observation positions. The maximum value of the gain is generally obtained when the center part of the screen was observed from the front of the screen.

For all the samples, the surface roughness Ra was measured based on ISO 468-1982, ISO 4287/1-1984 with a surface roughness form measuring device Surfcom 575A, manufactured by TOKYO SEIMITSU.

The three types of screen samples were combined with a Fresnel lens sheet comprising a Fresnel lens having a lens pitch of 110 μm formed of a cured product of an ultraviolet curable resin formed on an impact-resistant acrylic sheet with an acrylic bead diffusing agent having an average particle diameter of 30 μm incorporated therein. The assemblies thus obtained were sensorily evaluated (visually) for scintillation, external light reflection from the surface of the screen, and the contrast of the screen, with a 50 in. rear projection-type television provided with an LCD light source with a pupil diameter of a projection lens of 33 mm and having a projector distance of 750 mm and an incidence plane illuminance of 120 lx. The scintillation was evaluated by a relative evaluation method in which +3 represents the best results among the results for all the samples and −2 represents the worst results among the results for all the samples. The external light reflection from the surface of the screen and the contrast of the screen were evaluated by a relative evaluation method in which +3 represents the best results among the results for all the samples and 0 represents the worst results among the results for all the samples. The results are shown in Table 1.

The results of evaluation show that the multilayer construction in which the layer to which the diffusing material was added in a larger amount was disposed on the light outgoing side (Example 1) provided high-quality images with the lowest level of scintillation.

Examples 2 to 6

Figure 6:
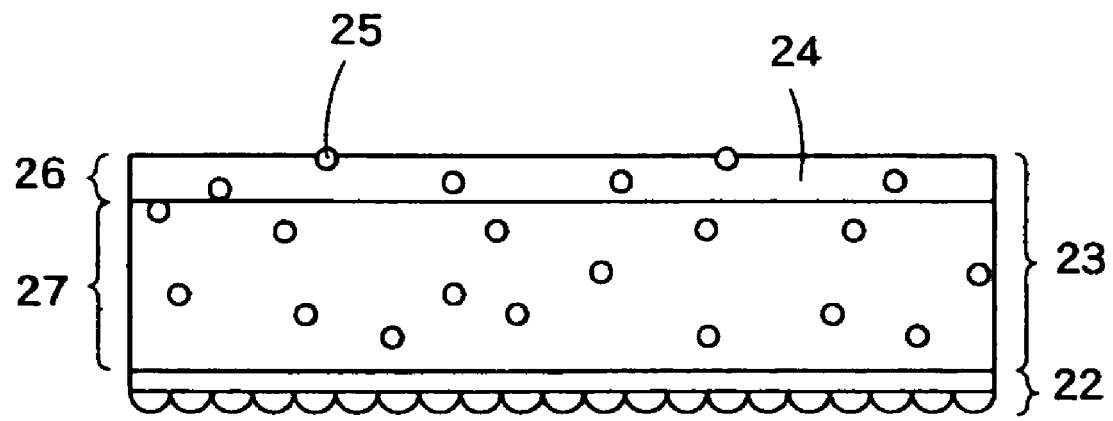
[FIG. 6] A cross-sectional view showing a light diffusing screen used in the evaluation of Examples 2 to 12.

A light diffusing screen, for a single light source-type rear projection television, for use in combination with a Fresnel lens sheet was prepared using a lenticular lens layer 22 and a light diffusing layer 23 having a double layer structure as shown in FIG. 6.

The lenticular lens layer 22 was prepared by forming a lenticular lens formed of a cured product of an ultraviolet curable resin and having a lens pitch P=150 μm, a lens transverse diameter a=0.08 mm, and a lens longitudinal diameter b=0.07 mm on 125 μm-thick PET.

PMMA was used as a light transparent matrix 24 of the light diffusing layer 23, and PMMA and a material prepared by regulating polymerization ratio between PMMA and PS were used as a light diffusing material 25. The refractive index Np of the light transparent-matrix was fixed to 1.49, and the refractive index of the light diffusing material was regulated to 1.52.

The light diffusing layer had a double layer structure comprising a surface side diffusing layer 26 and a light incidence side diffusing layer 27. In the preparation of the screen, the amount of the diffusing material added to the surface layer was regulated so that the surface roughness Ra on the light outgoing face was 0.1 to 1.3 μm. The thickness of the surface side diffusing layer was t26=0.2 mm, and the thickness of the light incidence side diffusing layer was t27=1.8 mm. For all the samples, the screen gain was regulated to 4.

The screen samples were combined with the above Fresnel lens. The assemblies thus obtained were sensorily evaluated (visually) by TV picture evaluation for scintillation, external light reflection from the surface of the screen, and the contrast of the screen, with the above 50 in. rear projection-type television. The scintillation was evaluated by a relative evaluation method in which +3 represents the best results among the results for all the samples and −2 represents the worst results among the results for all the samples. The external light reflection from the surface of the screen and the contrast of the screen were evaluated by a relative evaluation method in which +3 represents the best results among the results for all the samples and 0 represents the worst results among the results for all the samples. The results are shown in Table 1.

The results of the evaluation show that, when the surface roughness Ra of the light diffusing screen was 0.2 µm≦Ra≦1.0 µm, external light reflection from the surface of the screen was small and the contrast of the screen of was also good. Further, the surface roughness Ra is preferably 0.4 µm≦Ra≦0.6 µm. On the other hand, when the surface roughness Ra is Ra<0.2 µm, the effect of reducing external light reflection is disadvantageously small, while, when the surface roughness Ra is 1.0<Ra, disadvantageously, the picture plane of the screen is whitish and the contrast is lowered.

the samples were combined with a Fresnel lens sheet, and the assemblies were regulated so that the screen gain was 3.

The light diffusing screen samples were sensorily evaluated (visually) for scintillation, with the above 50 in. rear projection-type television. The scintillation was evaluated by a relative evaluation method in which +3 represents the best results among the results for all the samples and 0 represents the worst results among the results for all the samples. The results are shown in Table 2.

The results of the evaluation show that, for samples where the refractive index difference was 0<|Np−Ns|≦0.05, the scintillation was small. Further, the refractive index difference was preferably 0<|Np−Ns|≦0.03. On the other hand, when the refractive index difference |Np−Ns| exceeded 0.05, the scintillation was disadvantageously high.

TABLE 2

| | Light diffusing material | | |
|---|---|---|---|
| Material | Refractive index | Difference in refractive index between light diffusing material and matrix | Evaluation of scintillation |
| Ex. 7  PMMA | 1.49 | 0 | +3 |
| Ex. 8  MS-1 | 1.50 | 0.01 | +3 |

TABLE 1

| | Construction of diffusing layer | Diffusing material addition amount ratio [concentration ratio] (light outgoing layer/light incident layer) | Surface roughness Ra, µm | Evaluation of scintillation | External light reflection from screen surface | Contrast of screen |
|---|---|---|---|---|---|---|
| Ex. 1 | Double layer | 3:1 | 0.6 | +2 | +2 | +1 |
| Comp. Ex. 1 | Single layer | 1:1 | 0.1 | −1 | 0 | +3 |
| Comp. Ex. 2 | Double layer | 1:3 | 0.1 | −2 | 0 | +3 |
| Comp. Ex. 3 | Double layer | 3:2 | 0.1 | 0 | 0 | +3 |
| Ex. 2 | Double layer | 2:1 | 0.2 | +1 | +1 | +2 |
| Ex. 3 | Double layer | 5:2 | 0.4 | +2 | +2 | +2 |
| Ex. 4 | Double layer | 3:1 | 0.6 | +2 | +2 | +2 |
| Ex. 5 | Double layer | 4:1 | 0.8 | +3 | +3 | +1 |
| Ex. 6 | Double layer | 6:1 | 1.0 | +3 | +3 | +1 |
| Comp. Ex. 4 | Double layer | 8:1 | 1.1 | +3 | +3 | 0 |
| Comp. Ex. 5 | Double layer | 10:1 | 1.3 | +3 | +3 | 0 |

Examples 7 to 12

A light diffusing screen, for a single light source-type rear projection television, for use in combination with a Fresnel lens sheet was prepared using a lenticular lens layer 22 and a light diffusing layer 23 having a double layer structure as shown in FIG. 6. The amount of the diffusing material added to the surface layer side light diffusing layer was regulated so that the surface roughness on the light outgoing face was Ra=0.5 µm.

The lenticular lens layer 22 was prepared by forming a lenticular lens formed of a cured product of an ultraviolet curable resin and having a lens pitch P=150 µm, a lens transverse diameter a=0.08 mm, and a lens longitudinal diameter b=0.07 mm on 125 µm-thick PET PMMA was used as a light transparent matrix 24 of the light diffusing layer, and PMMA and a material prepared by regulating polymerization ratio between PMMA and PS were used as a light diffusing material 25. The refractive index Np of the light transparent matrix was fixed to 1.49, and the refractive index of the light diffusing material Ns was regulated in the range of 1.49 to 1.55 so that the refractive index difference (|Np−Ns|) was varied in the range of 0 to 0.06. All TABLE 2-continued

| | Light diffusing material | | |
|---|---|---|---|
| Material | Refractive index | Difference in refractive index between light diffusing material and matrix | Evaluation of scintillation |
| Ex. 9  MS-2 | 1.51 | 0.02 | +2 |
| Ex. 10 MS-3 | 1.52 | 0.03 | +2 |
| Ex. 11 MS-4 | 1.53 | 0.04 | +1 |
| Ex. 12 MS-5 | 1.54 | 0.05 | +1 |
| Comp. Ex. 6 MS-6 | 1.55 | 0.06 | 0 |

Examples 13 to 16

Next, Examples in which a hardcoat layer was formed on the light diffusing layer on its surface side will be described.

Figure 7:
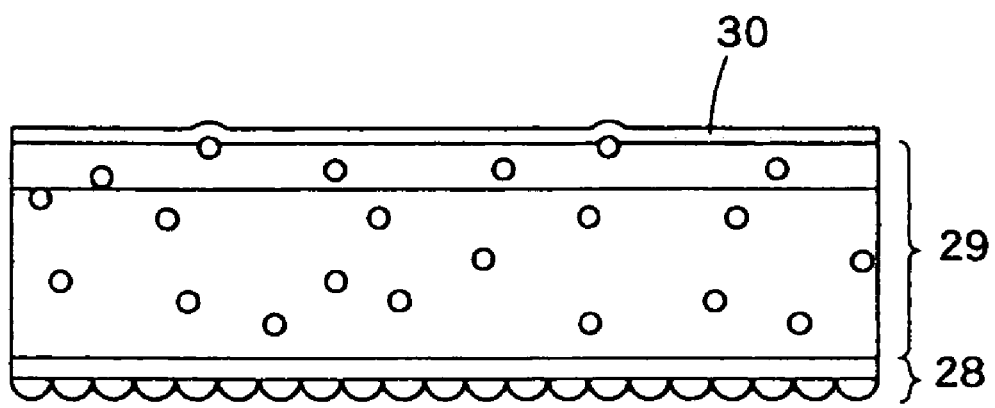
[FIG. 7] A cross-sectional view showing a light diffusing screen used in the evaluation of Examples 13 to 16.

As shown in FIG. 7, a hardcoat layer 30 formed of a cured product of an ionizing radiation curable material was formed on the viewer side of the light diffusing sheet comprising the lenticular lens layer 28 and the light diffusing layer 29 having a double layer structure. Samples were prepared so that the surface roughness Ra of the light diffusing layer 29 before hardcoat formation was 0.2 to 1.3 μm, followed by the formation of an ionizing radiation cured hardcoat layer on the surface thereof. In this case, the thickness of the hardcoat layer was regulated to 5 μm.

Table 3 shows data on surface roughness of the surface of the light diffusing sheet before and after the hardcoating for each sample.

The results of the evaluation show that the surface roughness after hardcoating could be regulated by regulating the roughness of the surface of the light diffusing sheet before hardcoating.

TABLE 3

| | Surface roughness Ra, μm | | External light reflection from screen surface | Contrast of screen |
|---|---|---|---|---|
| | Before hardcoat layer formation | After hardcoat layer formation | | |
| Comp. Ex. 7 | 0.2 | 0.1 | 0 | +3 |
| Ex. 13 | 0.5 | 0.2 | +1 | +2 |
| Ex. 14 | 0.8 | 0.3 | +2 | +2 |
| Ex. 15 | 1.0 | 0.4 | +2 | +2 |
| Ex. 16 | 1.3 | 0.4 | +2 | +2 |

As described above in detail, the present invention can provide a light diffusing screen that can reduce scintillation of a single light source-type projection television and, at the same time, can regulate the roughness of the screen surface, and can provide good picture images.

The invention claimed is:

1. A light diffusing screen for a transmission projection screen, which is a light diffusing screen for a single light source-type rear projection television, adapted for use in combination with a Fresnel lens sheet, said light diffusing screen comprising: a lens layer which can horizontally refract projected light; and a light diffusing layer provided on light outgoing side as compared with said lens layer, said light diffusing layer comprising a light transparent matrix and light diffusing fine particles formed of a light transparent material dispersed in the light transparent matrix, said light diffusing layer having a multilayer structure of which the outermost layer on the light outgoing side of said light diffusing layer is a layer which diffuses light most strongly, said outermost surface layer on the light outgoing side in said light diffusing screen having a surface roughness Ra of 0.2 μm≦Ra≦1.0 μm.

2. The light diffusing screen according to claim 1, wherein said light transparent matrix and said light diffusing fine particles constituting said light diffusing layer satisfy formula [I]

$$0 < |Np - Ns| \leq 0.05 \quad [1]$$

wherein Np represents the refractive index of said light transparent matrix; and Ns represents the refractive index of said light transparent material constituting said light diffusing fine particles.

3. The light diffusing screen according to claim 1, wherein said outermost layer on the light outgoing side in said light diffusing layer is the outermost surface layer on the light outgoing side of said light diffusing screen.

4. The light diffusing screen according to claim 1, wherein said outermost layer on the light outgoing side of said light diffusing layer comprises protrusions of said light transparent diffusing fine particles in their at least a part projected from within said light transparent matrix.

5. The light diffusing screen according to claim 1, wherein a hardcoat layer is further provided on the surface of the outermost layer on the light outgoing side of said light diffusing layer and said hardcoat layer is the outermost surface layer on the light outgoing side of said light diffusing screen.

6. The light diffusing screen according to claim 5, wherein said hardcoat layer contains therein an antistatic agent.

7. A process for producing a light diffusing screen, characterized in that, in a heat shrink process involved in cool solidification and/or curing in forming the light diffusing layer in a light diffusing screen according to claim 1 from a mixture of light transparent diffusing fine particles and a light transparent matrix different from each other in heat shrinkage, at least a part of said light transparent diffusing fine particles is projected from within said light transparent matrix.

* * * * *